US005227142A

United States Patent [19]

Murai et al.

[11] Patent Number: 5,227,142

[45] Date of Patent: Jul. 13, 1993

[54] PRODUCTION APPARATUS FOR VAPOR-GROWN FINE FIBERS

[75] Inventors: Takeji Murai; Koichi Imai; Toshiaki Noda; Hideo Kurioka, all of Tokyo, Japan

[73] Assignee: Nikkiso Co., Ltd., Tokyo, Japan

[21] Appl. No.: 737,811

[22] Filed: Jul. 29, 1991

[30] Foreign Application Priority Data

Jul. 30, 1990 [JP] Japan .................. 2-199129

[51] Int. Cl.[5] .................. B01J 8/08; C10B 31/32

[52] U.S. Cl. .................. 422/219; 422/213; 422/214; 432/8; 432/11; 110/214; 423/447.3

[58] Field of Search .................. 422/213, 214, 219, 134, 422/152, 153, 158, 159; 432/8, 11, 59, 96; 110/214; 423/441.1–441.3

[56] References Cited

U.S. PATENT DOCUMENTS

| | | | |
|---|---|---|---|
| 2,441,500 | 5/1948 | Miess | 432/8 |
| 2,668,701 | 2/1954 | Dietrich | 432/8 |
| 2,750,272 | 6/1956 | Lellep | 432/8 |
| 3,518,062 | 6/1970 | Delange et al. | 422/189 |
| 3,827,854 | 8/1974 | Gildersleeve | 432/8 |
| 4,248,639 | 2/1981 | Quittkat | 106/100 |
| 4,256,451 | 3/1981 | Johnson, Jr. | 432/14 |
| 4,572,813 | 2/1986 | Arakawa | 264/29.2 |
| 4,674,975 | 6/1987 | Corato et al. | 432/11 |
| 4,688,180 | 8/1987 | Motomiya | 364/477 |
| 4,753,777 | 6/1988 | Yoshinari et al. | 422/150 |
| 4,770,867 | 9/1988 | Coulon et al. | 423/447.3 |
| 5,102,647 | 4/1992 | Yamada et al. | 423/447.3 |

FOREIGN PATENT DOCUMENTS 9015297 12/1990 World Int. Prop. O. .................. 432/11

*Primary Examiner*—Robert J. Warden
*Assistant Examiner*—Christopher Y. Kim
*Attorney, Agent, or Firm*—Young & Thompson

[57] ABSTRACT

Production apparatus for vapor-grown fine fibers, comprising a vertical furnace and a horizontal furnace intersecting each other in an L-shaped configuration. Raw material and catalyst and carrier gas are injected into the top of the vertical furnace to form fine fibers that fall freely through the vertical furnace and land and rest on a conveyor in the horizontal furnace for conveying the fibers through the second furnace while the fibers grow in size. Gas and fibers are discharged from an end of the horizontal furnace remote from the vertical furnace. The horizontal furnace has second injecting structure injecting material for fiber growth but no catalyst into said horizontal furnace.

7 Claims, 2 Drawing Sheets

PRODUCTION APPARATUS FOR VAPOR-GROWN FINE FIBERS

FIELD OF THE INVENTION

This invention relates to an apparatus for producing fine fibers in a floating state by heating a catalyst for generating fibers, a raw material gas for fibers, and a carrier gas.

BACKGROUND OF THE INVENTION

It is known to produce fine fibers by vapor-growing, for example, vapor-grown carbon fibers. A substrate such as alumina and the like or graphite or the like is placed in an electric furnace, in which is provided an ultra-fine particle catalyst of iron, nickel, or cobalt as a core for growth of carbon fibers, over which is introduced a mixed gas of a hydro-carbon gas such as benzene or the like and a hydrogen carrier gas so as to decompose the hydrocarbon at a temperature of 800° to 1300° C., whereby carbon fibers can be grown on the substrate.

However, such a production means of vapor-growth in which the substrate is used has had many problems such that the yield is poor because temperature conditions and reaction conditions at the substrate surface are not uniform, and the productivity is also poor because it is troublesome to withdraw fibers continuously.

From such a viewpoint, the present applicant has already used an organic metal compound which is evaporated to make a matal catalyst in a gaseous phase to give a novel procedure, whereby it has been made possible to omit three operations of dispersing a conventional catalyst on a substrate, reducing in a furnace, and withdrawing formed fibers toward the outside of the furnace, and a gas of an organic compound as a carbon source in the gaseous phase and a gas of an organic transition metal compound as a catalyst source are subjected to thermal decomposition in an electric furnace heated to a required temperature, whereby the catalyst and the carbon fiber are continuously produced in a floating state to develop a means which has been filed as a patent application, resulting in allowance as a patent (Japanese Patent Publication No. 62-49363).

However, also in the means for producing vapor-grown fibers in relation to the above mentioned patent, accumulation of fibers in the furnace occurred, and it was difficult to make sufficiently continuous fibers.

As a reason therefor, it is postulated that catalyst particles generated in the electric furnace, for example, iron fine particles generated by decomposition of a gas of ferrocene (a state of which is not clear as pure iron, carbide of iron, or any one of solid, liguid, or gas) adhere to a wall of the furnace, which form fibers in a manner of the substrate method, and the fibers trap floating fibers to increase the accumulation. And as another one, it is postulated that the floating fibers adhere to the wall of the furnace for some reason, and the floating fibers deposit due to gravity especially in the case of a furnace of the horizontal type.

When fibers are accumulated in the furnace, there is a problem that granular carbon is formed probably because a gas stream in the furnace becomes irregular, and there is caused irregularity of products because fibers accumulated at the early stage of operation continue the growth in the diameter direction during the operation, which provides a great difference in diameter between fibers which have gone out from the furnace in a short period and fibers which have accumulated at the late stage of operation. Therefore, it was necessary that the accumulated fibers were removed at a suitable cycle.

A gas containing hydrogen is generally used as the carrier gas, so that the fibers must be scraped after replacing the inside of the furnace with a noncombustible gas such as nitrogen or the like, and hence no satisfactory operation performance is obtained. As a countermeasure therefor, a method has also been proposed in which a scraping unit of the screw type is provided at the inside of the furnace, and the accumulated fibers are continuously scraped during operation, however, there is a problem that the catalyst fine particles adhere to the screw to allow fibers to grow, and the operation performance inversely decreases due to elimination thereof. In addition, when a flow rate of gas is made large, or when the furnace is made short to make a staying period at the heating portion short, then a ratio of accumulation of fibers in the furnace decreases, but the thickness growth of fibers is insufficient, resulting in that fibers eluted from the furnace have extremely thin diameters.

Gary G. Tibbets et al. described in the specification of U.S. Pat. No. 4,565,684 that a concentration of a raw material gas is made low during the forming stage of fibers so as to make the number of fibers formed and their length as great as possible, and then the concentration of the raw material is made high so as to thicknen the fibers, whereby the production efficiency of fiber is increased. In this case, the above mentioned U.S. Patent considers the substrate method only, however, the substrate method basically has a poor productivity as described above. The present invention is directed to a problem of clogging due to fibers in a furnace in the fluidization gaseous phase method which basically has a high productivity, wherein no way of solution is given even by analogy to the method of the above mentioned U.S. patent.

The present inventors have done various investigations on the improvement of the operation performance and the improvement of the degree of freedom of decision on fiber diameter in the production of fine fibers by the vapor-growing method, and found that although the formation of fibers and the thickness growth thereof were conventionally performed at the same time in one furnace, the problems can be solved by separating the both steps, resulting in accomplishment of the present invention.

SUMMARY OF THE INVENTION

A production apparatus for vapor-grown fine fibers according to the present invention is characterized in that it has a construction of a furnace provided with a furnace of the vertical type and a furnace of the horizontal type connected with intersecting in an L-shaped configuration wherein at an upper part of said furnace of the vertical type is provided a first injecting means for supplying necessary components for fiber formation such as a raw material, a catalyst or a catalyst forming substance, a carrier gas and the like, at the inside of said furnace of the horizontal type is provided a conveying means for transporting formed fine fibers from a linking proximal portion of said furnace of the vertical type to the other end portion, and at the end of the other end portion with respect to said furnace of the vertical type are provided a fiber withdrawing means and a gas discharging means.

PREFERRED EMBODIMENTS OF THE INVENTION

Figure 1:
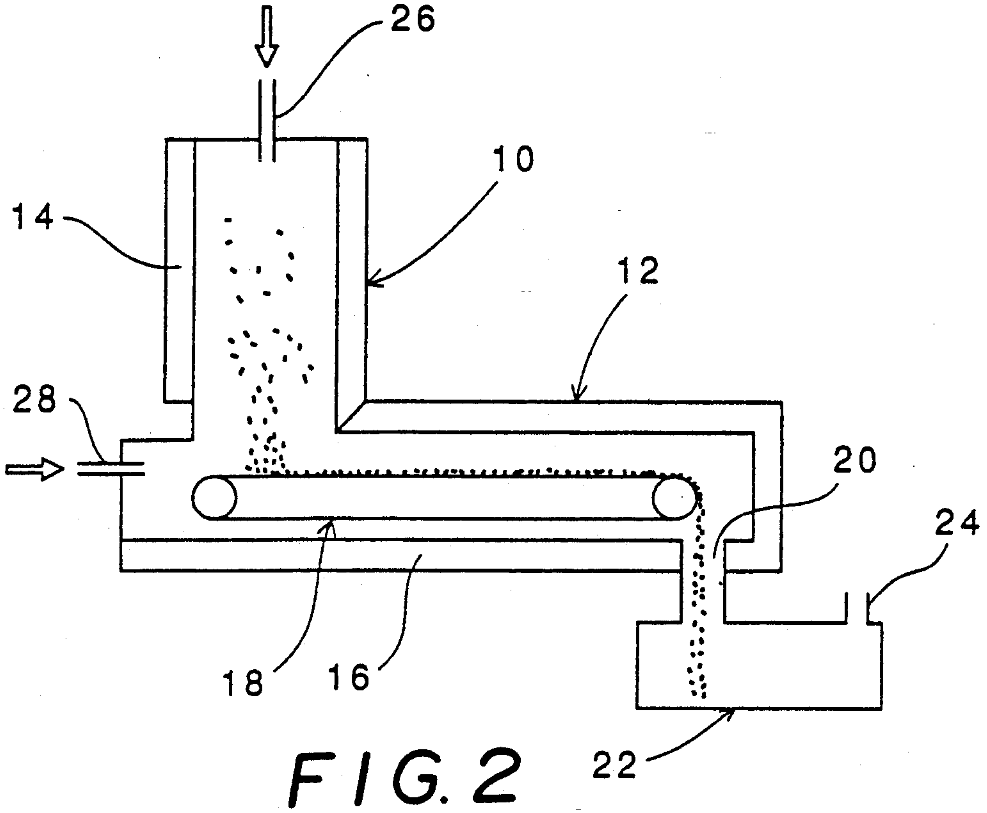
FIG. 1 is an illustrative cross-sectional view showing an example of the apparatus for producing vapor-grown fine fibers according to the present invention.

In the above mentioned production apparatus for vapor-grown fine fibers, the furnace of the vertical type and the furnace of the horizontal type may be constructed such that each furnace temperature can be independently regulated. In addition, the furnace of the horizontal type may be provided with a second injecting means for supplying necessary components for fiber growth except for the catalyst. In this case, there may be provided a means for eliminating gas having passed through the furnace of the vertical type toward the outside of the furnace.

Further, the conveying means may be constructed such that a conveying speed can be established in a variable manner.

Furthermore, it may be available that a cross section of the furnace is made rectangular, and a plurality of the first injecting means are provided at the upper part of the furnace of the vertical type.

Alternatively, it may be desirable that there is given a construction of a furnace of the horizontal type wherein at one end portion thereof is provided a first injecting means for supplying necessary components for fiber formation such as a raw material, a catalyst or a catalyst forming substance, a carrier gas and the like, at the end of the other end portion are provided a fiber withdrawing means and a gas discharging means, there is provided a conveying means for transporting formed fine fibers from a downward position below said first injecting means to the fiber withdrawing means, and there is provided a function capable of preventing invasion of atmosphere gas into the inside of said furnace.

In this case, it may be desirable that at a downstream end with respect to the first injecting means provided at one end portion of the furnace of the horizontal type is provided at least one second injecting means for supplying necessary components for fiber growth including neither the catalyst nor the catalyst forming substance, and further the furnace of the horizontal type is divided into two portions at an upstream side and a downstream side with respect to the second injecting means, and a furnace temperature of each of the divided furnaces can be independently regulated.

Therefore, according to the present invention, there is provided a production method for vapor-grown fine fibers characterized in that necessary components for fiber formation such as a raw material, a catalyst or a catalyst forming substance, a carrier gas and the like are injected from an upward position of a furnace into the inside of the furnace, whereby fine fibers are formed from falling catalyst fine particles, the fibers are accumulated on a conveying means to achieve fiber thickness growth with movement in the horizontal direction thereof, and the fine fibers thus grown are continuously withdrawn from the furnace.

The catalyst herein may be an organic transition metal compound such as iron, nickel, cobalt or the like which decomposes to form metal fine particles which serve as cores for formation of fibers, or may be the above mentioned metal fine particles themselves. In the case of the metal fine particles, they may be carried on the carrier gas as such to spray in the furnace, or they may be injected into the furnace in a state of suspension in liquid hydrocarbon which serves as a raw material for fibers.

In order to establish a catalyst concentration with a good accuracy, an organic transition metal which may be dissolved in hydrocarbon may be preferably used rather than the case in which the metal particles are used.

According to the production method and the apparatus for vapor-grown carbon fibers of the present invention, the following results are achieved. The diameter of the fine fiber can be freely established by selecting a conveying speed of the plates conveyed in the furnace of the horizontal type, and a concentration and a temperature of the raw material gas in the furnace of the horizontal type. Therefore, in order to restrict fiber adhesion to the inner wall of the furnace of the vertical type, even when the gas residence period in the furnace of the vertical type is made short by making the length of the furnace of the vertical type short, or by making the injecting amount of the first injecting means large to make a linear speed of the gas large, even if the diameter of the fine fiber falling onto the plates becomes thin on account of the above, there is given no limitation to a diameter of the final product.

Therefore, irrelevant to the fine fiber diameters to be required, a countermeasure can be adopted for preventing fiber adhesion to the inner wall of the furnace of the vertical type, and the productivity is greatly improved.

In the furnace of the horizontal type, free metal fine particles which are not included in the fine fibers have been reduced, or they have been optionally discharged to the outside of the furnace immediately below the furnace of the vertical type, so that substantially no fine fiber is newly formed, and fine fibers having fallen on the plates for conveying undergo thickness growth in the diameter direction while moving in the furnace of the horizontal type and they are withdrawn to the outside of the furnace together with the plates, so that the furnace of the horizontal type is also not subjected to blockage.

The metal fine particles formed in the furnace of the vertical type form the fine fibers while falling. The fine fibers are accumulated on the plates, which are subjected to thickness growth while being conveyed in the furnace of the horizontal type and they are withdrawn from the furnace together with the plates. The production of the fine fibers is continuously carried out without changing a furnace temperature and each injecting amount, and new plates are supplied continuously or intermittently, and plates on which grown fine fibers are accumulated are withdrawn continuously or intermittently.

Incidentally, when a height of the furnace of the horizontal type is made large, with a height of the furnace of the vertical type substantially zero, a construction comprising only the furnace of the horizontal type may be provided. Therefore, in this case, at one end portion of the furnace of the horizontal type is provided the first injecting means for supplying necessary components for fiber formation such as a raw material, a catalyst or a catalyst forming substance, a carrier gas and the like, and the other constructions are the same as described above, whereby vapor-grown fine fibers can be produced in the same manner as described above. In this case, only when the position of the first injecting means is at an upper part of the furnace, the injecting direction may be any one of a vertical direction or a horizontal direction.

Next, the production method for vapor-grown fine fibers according to the present invention will be explained in detail hereinafter with reference to attached drawings in relation to the appratus for carrying out the above.

FIG. 1 is an illustrative construction figure showing an example of an apparatus for producing vapor-grown fine fibers according to the present invention. In FIG. 1, a reference numeral 10 indicates a furnace of the vertical type and 12 a furnace of the horizontal type respectively, and the furnace of the vertical type 10 is connected with the furnace of the horizontal type 12 at one end portion intersecting in an L-shaped configuration. A construction is given such that at outer peripheral portions of the above mentioned furnace of the vertical type 10 and the furnace of the horizontal type 12 are arranged independent heaters 14 and 16 respectively, and temperature conditions and the like can be independently adjusted with respect to each of the furnaces. However, the structure of the furnace is generally a cylindrical configuration having a circular cross-section, and for the inner wall of the furnace is used quartz glass, ceramics, metal or the like which resists furnace temperature (800° to 1300° C.) and does not contain iron, nickel, cobalt, or other transition metals which serves as a catalyst for fiber formation. Incidentally, it is a matter of course that these materials must be those which do not react with hydrogen which is mainly used as a carrier gas and with carbon to be formed. In addition, the cross section of the furnace may be a rectangular parallelopiped type in relation to the conveying means. Further, a length of the furnace differs depending on production conditions, for which it is preferable that usually a length of the furnace of the vertical type 10 may be established to be a length such that non-decomposed organic transition metal compounds decrease to be not more than 20% at an outlet (inlet of the furnace of the horizontal type).

Figure 4:
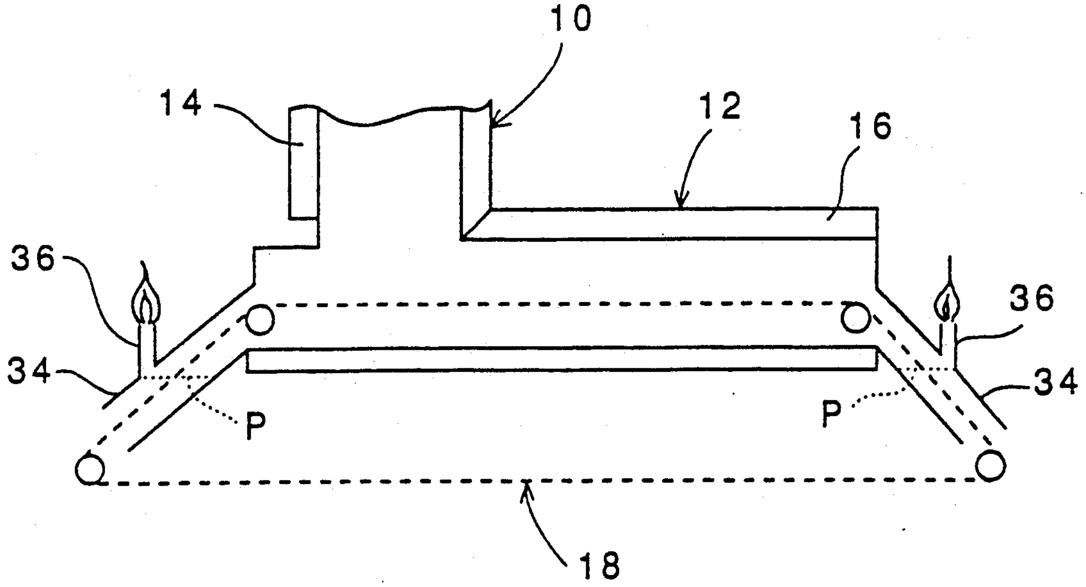
FIG. 4 is an illustrative cross-sectional view of an important part showing a modified example of the apparatus for producing vapor-grown fine fibers according to the present invention.

And at the inside of the furnace of the horizontal type 12 is provided a conveying means 18 such as an endless conveyer or the like which extends from the linking portion with the furnace of the vertical type 10 to the other end portion. In this case, as a structure of the conveyer as the conveying means 18 may be used quartz glass, ceramics, or metal which resists furnace temperature (800° to 1300° C.) and does not contain iron, nickel, cobalt, or other transition metals which serves as a catalyst for fiber formation in the same manner as the above mentioned inner wall of the furnace. For example, it may be constructed as a belt conveyer in which ceramic plates are connected by a ceramic chain to be rotated at the inside of the furnace as shown in the figure, or it may be constructed to go to the outside of the furnace at the other end portion so as to return at the outside of the furnace (see FIG. 4). However, in the case of rotation at the outside of the furnace, it is necessary for material qualities of rollers, bearings and the like which are installed in the furnace to contain no metal component which serves as a catalyst and to be excellent in heat resistance. However, when the returning passage is at the outside of the furnace, in the case of use of hydrogen as a carrier gas, such means are necessary that an inert gas curtain is provided so as not to allow air to enter the inside of the furnace and sealing is performed in a gas flow of hydrogen also with respect to a returning conveyer. At the other end portion of the furnace of the horizontal type 12 at which the above mentioned conveying means has been provided is provided an opening port 20 at a downward position, at a lower portion of which is installed a fiber withdrawing means 22 for recovering fibers which fall from the conveying means 18. And this fiber withdrawing means 22 is provided with a gas discharging means 24 for discharging gas introduced into the inside of the furnace. Incidentally, this gas discharging means 24 is not necessarily provided together with the fiber withdrawing means 22, which can be provided at the vicinity of the opening port 20 of the conveying means 18 at which the fiber withdrawing means 22 is provided. In addition, in the embodiment in which the return of the conveyer of the conveying means 18 is established at the outside of the furnace, an outlet portion of the conveyer provides the fiber withdrawing means and the gas discharging means.

In the furnace comprising the above mentioned constructions, at an upper part of the furnace of the vertical type 10 is provided a first injecting means 26 for supplying necessary components for fiber formation. Thus, with respect to this injecting means 26, for example, a construction is given such that a catalyst forming substance is dissolved in hydrocarbon, which is sent as a liquid to a preheater by means of a quantitative pump to be completely vaporized by the preheater after mixing with a carrier gas, and an obtained mixed gas is sent to the furnace of the vertical type 10. In addition, in this case, a larger cross section of the furnace of the vertical type 10 is preferable becuase of adhesion of fibers. In addition, when a production amount is increased, it is preferable for the same reason that the cross section of the furnace is made large and the number of the injecting means 26 is made many rather than many furnaces being provided together.

In the production apparatus for vapor-grown fine fibers thus constructed according to the present invention, the heaters 14,16 are actuated beforehand to adjust the furnace of the vertical type 10 and the furnace of the horizontal type 12 to be in required temperature conditions respectively, and then necessary components for fiber formation such as a raw material, a catalyst, a carrier gas and the like are supplied to the inside of the furnace from the first injecting means 26 provided at the upper part of the furnace of the vertical type 10. As a result, certain fibers are formed by vapor-growth at the inside of the furnace of the vertical type 10. In this case, owing to the structural feature of the furnace of the vertical type 10, or since the formed fibers are not subjected to thickness growth yet to be thin to be easy for being carried on a gas flow, little adhesion of fibers to the internal wall takes place. And the fibers formed at the inside of the furnace of the vertical type 10 arrive at the linking portion with the furnace of the horizontal type 12, which successively fall onto the conveying means 18 provided at the inside of the furnace of the horizontal type 12 to be conveyed to the fiber withdrawing means 22 with continuing growth in the diameter direction. At the position of the fiber withdrawing means 22, all of the conveyed fibers are automatically recovered by the fiber withdrawing means 22. By doing so, according to the apparatus of the present invention, fibers having an approximately uniform diameter can be smoothly grown and recovered continuously without adhesion to the inner wall of the furnace.

Incidentally, in the above mentioned apparatus shown in FIG. 1, such a construction may be available that at one end portion of the furnace of the horizontal type 12 for linking with the furnace of the vertical type 10 is provided a second injecting means 28, from an injecting port of which are optionally injected necessary components for fiber formation such as a raw material, a carrier gas and the like except for a catalyst. Thereby a raw material consumed in the furnace of the vertical type 10 may be replenished to establish the inside of the furnace of the horizontal type 12 to have a higher concentration than that of the inside of the furnace of the vertical type 10. As a result, in combination with the independent adjusting function of each of the furnaces, formation and growth conditions of fibers can be independently changed with respect to the furnace of the vertical type 10 and the furnace of the horizontal type 12, and the most suitable formation and growth conditions of fibers can be independently selected respectively. In addition, also in this case, it is a preferable embodiment that a plurality of the injecting means 28 are provided in the length direction of the furnace of the horizontal type 12, and the raw material gas is compensated for a degree of consumption so as to maintain a raw material gas concentration to be constant. When the furnace width is wide and there is a risk of irregularity of the raw material gas concentration in the width direction, a plurality of the injecting means 28 may be provided in the width direction. The raw material and the carrier gas may be supplied from separate injecting ports, however, it is preferable to use the same injecting port from a viewpoint of preventing generation of soot. Further, it is effective to preheat the injecting gas beforehand within a range not to exceed a decomposing temperature of the raw material because the temperature irregularity is not made large.

Figure 2:
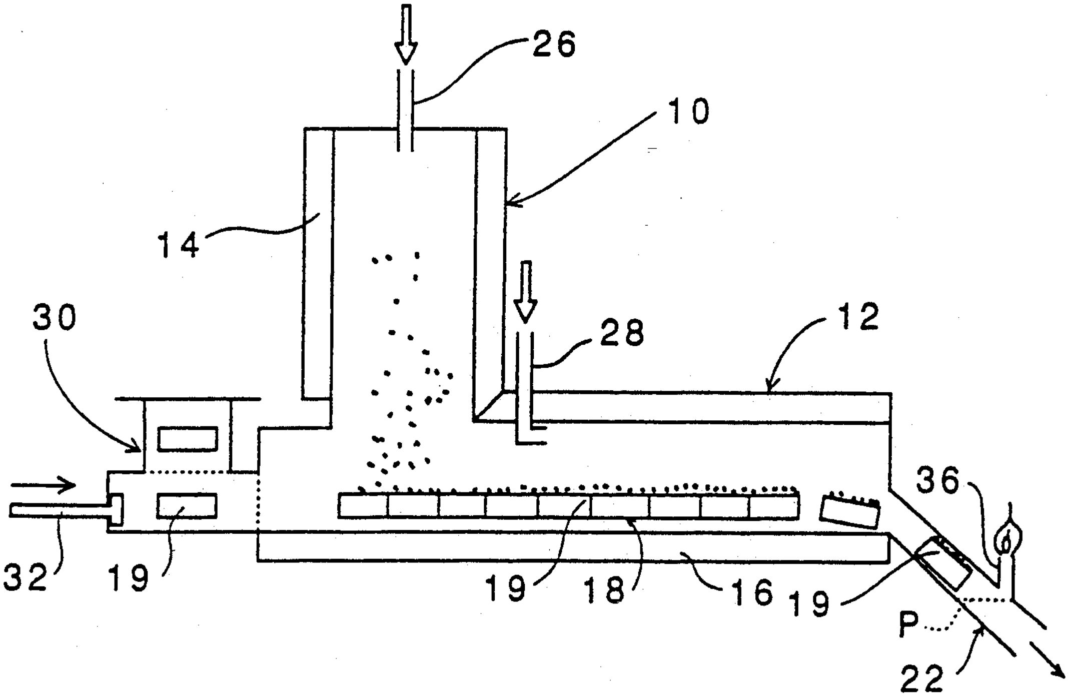
FIG. 2 is an illustrative cross-sectional view showing another example of the apparatus for producing vapor-grown fine fibers according to the present invention.

FIG. 2 is an illustrative construction figure showing another example of the production apparatus for vapor-grown fine fibers according to the present invention. Incidentally, for convenience of explanation, the same construction parts as those of the apparatus shown in FIG. 1 are designated by the same reference numerals, detailed explanation of which will be omitted. Namely, the apparatus shown in FIG. 2 represents another example of the conveying means 18 provided at the inside of the furnace of the horizontal type 12, which is constructed such that when the chain which contains no catalyst metal component as in the example shown in FIG. 1 cannot be used, independent plates 19 comprising ceramics or the like [that is quartz glass, metal or the like which resists furnace temperature (800° to 1300° C.) and does not contain iron, nickel, cobalt or other transition metals which serves as a catalyst for fiber formation] are arranged, the plates 19 are sequentially supplied from a supplying means 30 provided at the side of one end portion of the furnace of the horizontal type 12, they are introduced one by one toward the other end portion of the furnace of the horizontal type 12 by means of an introduction means 32 such as a pusher or the like to transport, and the plates 19 introduced at the other end portion of the furnace of the horizontal type 12 are sequentially transported to the fiber withdrawing means 22 so as to perform recovery of fibers there, whereby recovery of fibers can be smoothly achieved.

In this case, wherein the plates 19 are introduced into the chamber, the atmosphere inside this chamber is firstly replaced by an inert gas, and then replacement is completely performed by a carrier gas, after which extrusion is carried out by the extruding means 32 so as to move the plates 19 in the inside of the furnace 12 by a degree of one individual at the same time. Incidentally, it is desirable that the above mentioned chamber is sufficiently closed from the furnace 12 and the outside air by means of an opening and closing shutter. If this closure is insufficient, when one shutter is opened, the gas in the chamber forms an ascending stream to escape to the outside air, and air invades from the fiber withdrawing means 22 into the inside of the furnace to give a dangerous state. Therefore, it is also a preferable embodiment that a lid is provided at a plate outlet of the fiber withdrawing means 22, which opens or closes depending on falling momentum of the plates 19 or automatically after detecting falling of the plates 19. In addition, there may be provided such a construction that the plates 19 are supplied to the chamber from a downward portion so as to make a height of a plate supplying port of the chamber even with the outlet of the fiber withdrawing means 22, whereby generation of the ascending gas stream can be prevented.

In addition, in the present example, the second injecting means 28 is effective provided that it is at the vicinity of the linking portion between the furnace of the horizontal type 12 and the furnace of the vertical type 10, which may be provided at a position, for example, shown in FIG. 2.

Incidentally, in the example shown in FIG. 2, in order to prevent invasion of air into the furnace, it is preferable to establish an inner pressure to be slightly higher than the atmospheric pressure. In this case, when a combustible gas such as hydrogen or the like is used as a carrier gas, a construction may be given such that a gas discharging port 36 is provided at a part of a passage which forms the fiber withdrawing means 22, and exhaust gas is subjected to combustion at this gas discharging port 36, whereby a boundary surface P is formed owing to difference in specific gravities of air and hydrogen at the vicinity of the gas discharging port 36 of the above mentioned passage, and air is not allowed to enter the inside of the furnace.

Figure 3:
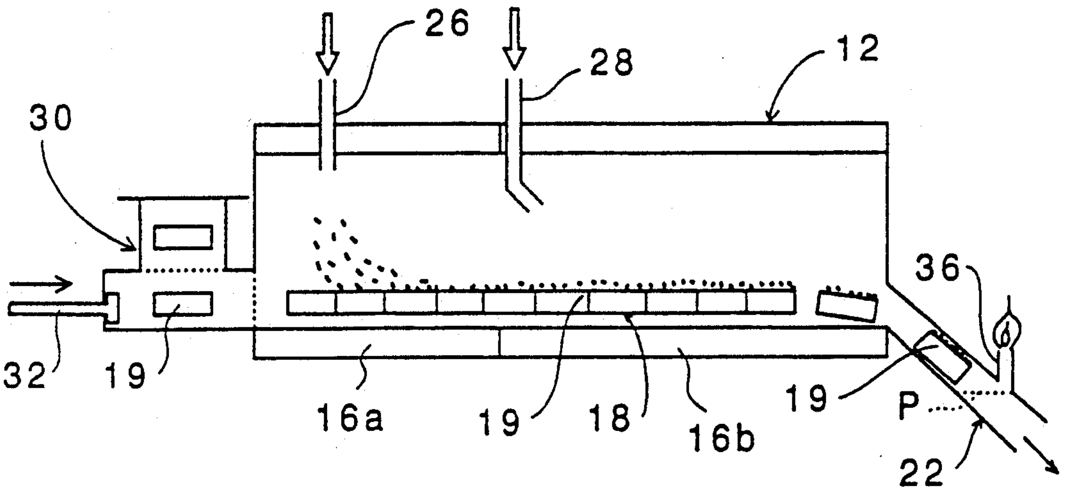
FIG. 3 is an illustrative cross-sectional view showing still another example of the apparatus for producing vapor-grown fine fibers according to the present invention.

FIG. 3 is an illustrative construction figure showing still another example of the production apparatus for vapor-grown fine fibers according to the present invention. Incidentally, for convenience of explanation, the same construction parts as those of the apparatuses shown in FIG. 1 through FIG. 2 are designated by the same reference numerals, detailed explanation of which will be omitted. Namely, in the apparatus shown in FIG. 3, there is provided such a construction that when the height of the furnace of the horizontal type 12 is made large, the height of the furnace of the vertical type is made substantially zero, and it comprises the furnace of the horizontal type 12 only. Therefore, in the present example, at an upper part at the side of one end portion of the above mentioned furnace of the horizontal type 12 is provided the first injecting means 26 for supplying components necessary for fiber formation. Other constructions are approximately the same as those of the example shown in the above mentioned FIG. 2. Incidentally, in the present example, there is provided such a construction that at a downstream side with respect to the above mentioned first injecting means is provided the second injecting means 28 for supplying necessary components for fiber formation such as a raw material, a carrier gas and the like except for a catalyst, and the furnace of the horizontal type which locates at the upstream side and the downstream side with respect to this second injecting means 28 is divided into two parts, and temperatures of respectively divided furnaces, namely of heaters 16*a*,16*b* can be independently regulated.

Also in the apparatus of the present example thus constructed, the same production for vapor-grown fine fibers can be achieved as the example shown in the above mentioned FIG. 2.

The preferable embodiments of the present invention have been explained hereinbefore, however, it is a matter of course that the present invention is not limited to the above mentioned examples, and various design modifications can be done within a range without departing from the spirit of the present invention.

For example, the conveyer as the conveying means 18 is made porous, and at the downward side from the lower conveyer of the furnace of the vertical type 10 is provided a gas suction hole, thereby a gas injected from the first injecting means 26 and passed through the furnace of the vertical type 10 is completely exhausted, and a concentration of the organic transition metal compound which is a catalyst for fiber formation is made substantially zero in the furnace of the horizontal type 12, whereby generation of fibers on the conveyer can be prevented. Namely, when fibers are newly generated during movement of the conveyer in the furnace of the horizontal type 12, there is given a cause for providing irregularity in fiber diameters, which can be prevented.

In addition, the flow in the furnace of the horizontal type 12 is disturbed, or the conveying means 18 is vibrated, whereby growth irregularity of fibers generated on the conveying means 18 can be prevented.

Further, when a construction is given such that a part of the conveying means 18 moves at the outside of the furnace, a metal wire brush or the like is used at the inlet or the outlet of this conveying means 18 so as to perform peeling and cleaning of the surface, whereby it can be prevented that fibers partly adhered to the conveying means 18 repeatedly pass through the inside of the furnace of the horizontal type 12 to grow into fibers having large diameters.

Incidentally, in the furnace of the vertical type 10, in relation to the first injecting means 26, for example, when the number of the injecting ports is many, if a cross section thereof is made rectangular, then the preventing effect of fiber adhesion can be realized by means of a more compact furnace construction.

In addition, a carrier gas and a hydrocarbon gas are injected from the second injecting means 28, whereby it can be adjusted that fibers are made thick while moving in the furnace of the horizontal type 12. In this case, hydrocarbon used in the first injecting means 26 may be different from that used in the second injecting means 28. For example, in the first injecting means 26, in order to adjust a ratio of hydrocarbon to the organic transition metal, it is preferable that one which is a liquid at an ordinary temperature (for example, a solution in which ferrocene is dissolved in benzene at a certain ratio) is vaporized by a preheater in the presence of hydrogen to use as hydrocarbon, and in the second injecting means 28, hydrocarbon which is a gas at an ordinary temperature (for example, methane gas, or natural gas) may be mixed with hydrogen to use.

At the inside of the furnace, in order to prevent invasion of air, it is preferable that an internal pressure is established to be slightly higher than the atmospheric pressure. Thus, there may be provided such a construction that when a combustible gas such as hydrogen or the like is used as a carrier gas, in the case of a construction of the conveying means 18 as shown, for example, in FIG. 4, at the inlet and outlet ports 34,34 of the conveyer as the conveying means 18 are respectively provided gas discharging ports 36,36, and exhaust gas is subjected to combustion at these gas discharging ports, whereby at the vicinity of the gas discharging ports 36,36 of the above mentioned inlet and outlet ports 34,34 is formed the boundary surface P owing to difference in specific gravities of air and hydrogen so as not to allow air to enter the inside of the furnace.

Incidentally, the conveying means 18 is not necessarily a plate configuration, and when it is made as one having a box configuration, then fewer fibers formed in the furnace drop during transport.

With respect to vapor-grown carbon fibers, generally growth in the fiber length direction mainly occurs under a condition having a low carburizing tendency, while deposition of carbon at the fiber surface is vigorous under an atmosphere condition having a high carburizing tendency to accelerate the thickness growth, and metal fine particles which serve as growth ends of length are also covered with carbon to stop the growth in the length direction. Therefore, when the apparatus of the present invention is used, the furnace of the vertical type is at a relatively low temperature wherein a raw material concentration in a gaseous phase is made relatively low and a hydrogen concentration is established to be relatively high so as to extend the life of the metal fine particles to be a long period to increase the efficiency of the length growth, while in the furnace of the horizontal type, a temperature is inversely made relatively high wherein a raw material concentraion is also made relatively high and a hydrogen concentration is established to be relatively low (provided that any one of them is in a range without generating soot) so as to increase the efficiency of the thickness growth, thereby an overall productivity is increased and nonuniformity of products can be restricted.

In addition, in the present invention, the formation and growth of fibers are based on the fluidization method, wherein accumulation takes place on the conveying means 18 only, and there is no formation from a substrate. Therefore, the fibers can be recovered from the conveying means 18 with ease.

In the above mentioned examples, explanation has been given exemplified by cases in which the vapor-grown carbon fibers are produced respectively, however, there is no limitation thereto. For example, application is available for fine fibers comprising carbon and silicon in which an organic silicon compound is used instead of hydrocarbon such as benzene and the like, organic sulfur compounds, and carbon fibers in which carbon monoxide is used. Further, as a carrier gas and/or a raw material used for the first injecting means and/or the second injecting means may be used sulfur compounds such as hydrogen sulfide, thiophene and the like.

As clarified from the above mentioned examples, according to the present invention, the forming step of fibers can be separated from the growing step so as to independently change conditions respectively, so that a temperature, a concentration, a residence period and the like can be freely selected depending on a catalyst, a raw material, and a carrier gas respectively used, and a diameter of the fiber can be freely established. In addition, little accumulation of fibers occurs, and continuous operation can be performed for a long period, and as a result thereof, a high productivity can be obtained. Moreover, little adhesion of fibers to the internal wall takes place.

Therefore, when vapor-grown fine carbon fibers are produced, a condition in which there is low formation of granular carbon can be selected, and there is given an extremely great effect for contributing to an improvement of product quality and stability.

What is claimed is:

1. Production apparatus for vapor-grown fine fibers, comprising a vertical furnace and a horizontal furnace intersecting each other in an L-shaped configuration, means injecting raw material and catalyst and carrier gas into the top of the vertical furnace to form fine fibers that fall freely through the vertical furnace, conveying means in the horizontal furnace on which said fibers rest, for conveying said fibers through said second furnace while said fibers grow in size, and means for discharging gas and fibers from an end of said horizontal furnace remote from said vertical furnace.

2. Production apparatus as claimed in claim 1, wherein said horizontal furnace has second injecting means injecting material for fiber growth but no catalyst into said horizontal furnace.

3. Production apparatus as claimed in claim 1, and means to combust gas that has passed through said horizontal furnace.

4. Production apparatus as claimed in claim 1, wherein said conveying means comprises a plurality of separate plates on which said fibers rest in said horizontal furnace, means to push said plates through said horizontal furnace, and means for separately removing each said plate at said remote end of said horizontal furnace.

5. Production apparatus for vapor-grown fine fibers, comprising a horizontal furnace, first means injecting raw material and catalyst and carrier gas into the top of one end of the furnace to form fine fibers that fall freely through the furnace, conveying means in the furnace on which said fibers fall and rest, for conveying said fibers through said furnace while said fibers grow in size, means for discharging gas and fibers from an end of said furnace remote from said one end, and second injecting means injecting material for fiber growth but no catalyst into said furnace at a point spaced between said first means and said remote end.

6. Production apparatus as claimed in claim 5, and further comprising means to combust gas that has passed through said furnace.

7. Production apparatus as claimed in claim 5, wherein said conveying means comprises a plurality of separate plates on which said fibers rest in said furnace, means to push said plates through said furnace, and means for separately removing each said plate at said remote end of said furnace.

* * * * *